Dec. 8, 1970  A. V. KLANCNIK  3,545,019
MACHINE TOOLS
Filed April 9, 1968  2 Sheets-Sheet 1
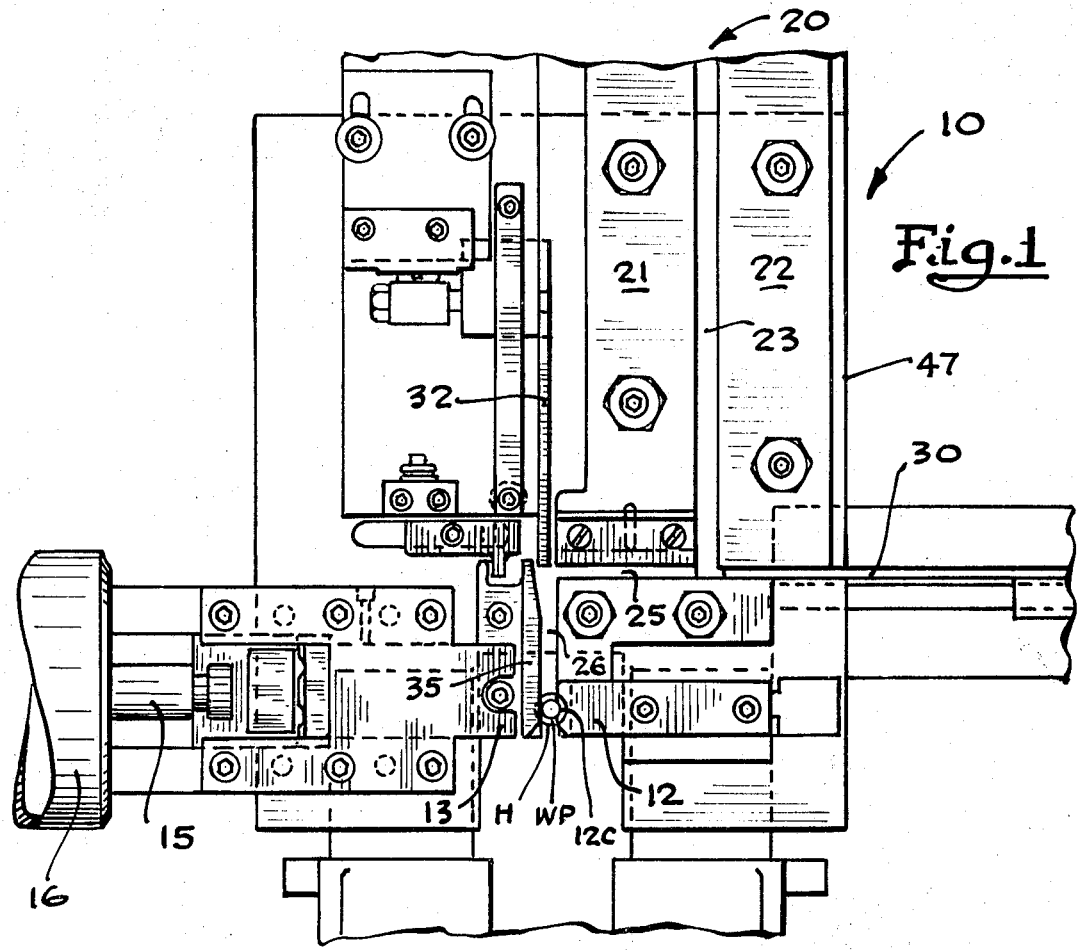
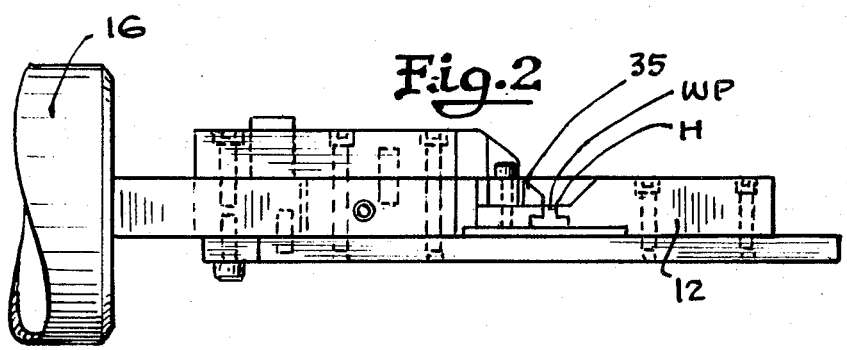
Inventor
Adolph V. Klancnik
By Wallace, Kinzer and Dorn
Attorneys Inventor
Adolph V. Klancnik
By Wallace, Kinzer and Dom
Attorneys

# United States Patent Office 3,545,019
Patented Dec. 8, 1970

3,545,019
MACHINE TOOLS
Adolph V. Klancnik, 1020 Glenview Road,
Glenview, Ill. 60025
Filed Apr. 9, 1968, Ser. No. 719,965
Int. Cl. B23g 1/00
U.S. Cl. 10—107                                    4 Claims

ABSTRACT OF THE DISCLOSURE

In a machine tool where relatively small or thin-walled work pieces are located at a work station in position to have the tool presented to one end, the work piece is effectively clamped to resist the thrust and torque of the tool by pressure applied to the rear of the work piece. Such back pressure may be used in addition to side clamping pressure if the work piece is strong enough to withstand side clamping, or the back clamp may be used as the sole effective force-resisting means especially in the instance of thin-walled work pieces.

---

This invention relates to machine tools of the character disclosed in my Pat. No. 3,109,557 and in particular a back clamp which may serve as the effective means for resisting the thrust and torque of the tool.

The machine tool of my aforesaid patent is admirably suited to drilling, tapping or counter-boring relatively small work pieces in the nature of small studs and the like. There, the work piece is clamped on the sides by a pair of jaws, one being fixed and the other movable in a lateral sense. However, in the instance of thin-walled hollow work pieces, side clamping pressure cannot always be effectively used to resist the torque and thrust of the tool without the cylindrical work piece being crushed or distorted, and the primary object of the present invention is to enlarge the adaptability of machine tools of the aforesaid kind by uniquely enabling the work piece to be effectively clamped from the back. By virtue of such an arrangement, the jaws of the machine tool of my earlier patent may be used purely in a locating sense, that is, the pressure applied thereby to the sides of the work piece is really that required to initially locate and hold the work piece in position to enable the tool to be applied to the front end thereof. The back clamp of the present invention then becomes the effective means for resisting the forces of the tool applied to the work piece, holding the work piece stationary while the desired operation is performed by the rotating tool, and so to do is another statement of an object of the present invention. It will be appreciated that various operations which may be performed by the tool have technical designations in the art in terms of drilling, tapping, counter-boring and so on, but in all instances a recess is formed in the work piece whether it be a smooth opening, a tapped opening, or an enlargement of an opening previously formed.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

Figure 3:
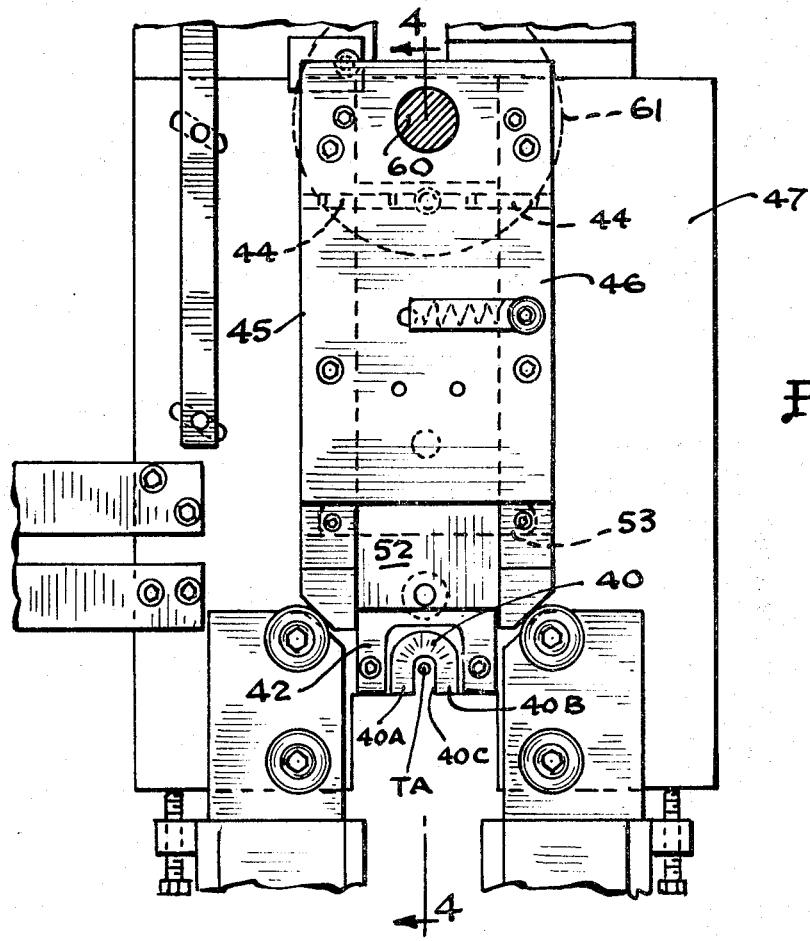
Figure 4:
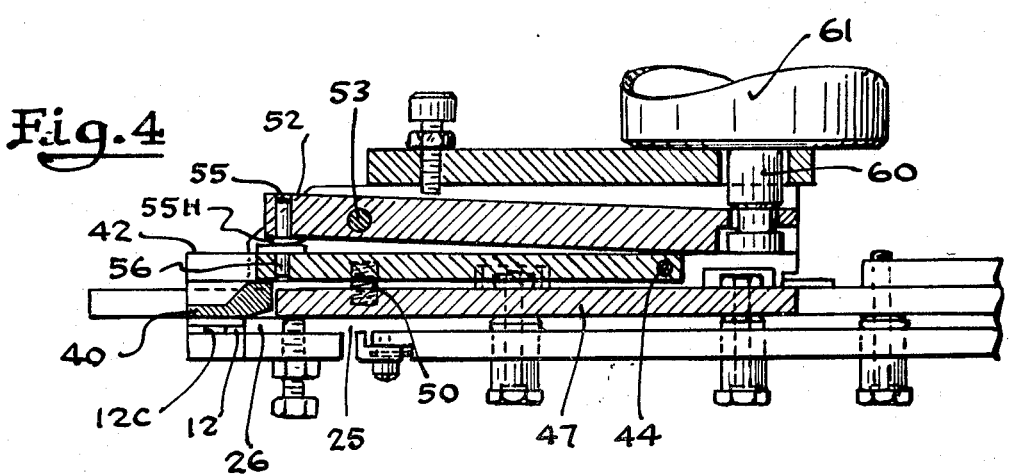

In the drawings:
FIG. 1 is a front elevation of a machine tool constructed in accordance with the present invention;
FIG. 2 is a view taken in front of the work station shown in FIG. 1;
FIG. 3 is an elevational view at the rear of the machine shown in FIG. 1; and
FIG. 4 is a sectional view (turned 90°) on the line 4—4 of FIG. 3.

The machine tool 10 in the present instance is for the most part constructed in accordance with the principles of the machine tool of my Pat. No. 3,109,557. Thus, and referring to FIG. 1 which is a view at the front of the machine, work pieces as WP are to be located one by one at a work station defined by a fixed jaw 12 and a movable jaw 13, the latter being reciprocated horizontally by means of an air operated piston 15 associated with a corresponding cylinder 16. The end face of the fixed jaw 12 which bears on the work piece is configured at 12C to be complemental to one side of the work piece, and as the machine is viewed in FIG. 1, a drill or other rotary tool will be presented to the front end of the work piece to form an axially extending recess therein of the desired character.

The machine includes what amounts to a vertical magazine 20 defined by a pair of left and right hand rails 21 and 22 which have the adjacent vertical edges thereof spaced apart a distance corresponding to the shanks of the work pieces so that the latter may be neatly confined therebetween in a vertically packed row. Thus, the work pieces are present as a supply in the groove 23 thus defined by the spaced edges of the rails 21 and 22 and are free to move by gravity downwardly therein.

The lower end of the vertical passage or channel 23 terminates at the right-hand end of a transfer passage 25, FIG. 1, which extends leftward in a horizontal direction to a vertical channel 26 which leads to the work station where each work piece WP is to be located.

The lowermost work piece in the channel 23 is located immediately adjacent a reciprocal feed slide 30 reciprocated in a horizontal direction by an air operated piston fully in accordance with the disclosure in Pat. No. 3,109,557. Thus, the reciprocal slide 30 when advanced in a forward direction to the left as viewed in FIG. 1 shifts the lowermost work piece from the bottom of channel 23 transversely along the length of the transfer passage 25, transferring the work piece to the channel 26.

A plunger 32 is aligned with channel 26 and when driven downwardly by an air operated piston, as described in Pat. No. 3,109,557, moves the work piece into position between the jaws 12 and 13.

It will be appreciated that these are coordinated and accurately timed operations insofar as feeding of the work pieces is concerned, which is to say that the movement of the reciprocal positioning jaw 13 is coordinated with the operation of the plunger 32 so that when the work piece being moved downward in channel 26 attains an approximate position in alignment with the holding jaws, the movable jaw 13 is advanced rightwardly as viewed in FIG. 1 to hold the work piece against the configured recess in the fixed jaw 12. It may be moreover pointed out that the operating end of the movable jaw is provided with a resiliently mounted camming plate 35. The camming plate 35 serves, in cooperation with plunger 32, to urge the work piece next to be worked on into the configured recess of the fixed jaw 12, and thereafter the piston 15 is actuated to apply what may be a limited positive positioning force, accurately locating and holding the work piece in position at the work station.

In accordance with the principles of this invention, the jaws 12 and 13 in effect cooperate to apply a force on the sides of the work pieces which need be no more than that required to present a firm grip without crushing or distorting the work piece. Thus, the principal clamping pressure, holding the work piece stationary while the tool is machining the work piece, is from the back or rear face of the work piece and the manner in which this is accomplished will now be described.

FIG. 3 is an elevation at the back of the machine, and for purposes of orientation the reference character TA identifies the axis of the tool in terms of the work station where the work piece WP, FIG. 1, will be located. Thus, the rear of the work station is open, making it possible to use the tool from either direction. Back clamping pressure is applied by a U-shaped wear plate 40, FIGS. 3 and 4, which is appropriately recessed medially at 40C in such form as to both expose the work station from the rear while enabling a holding pressure to be exerted on the rear face of the work piece. By thus recessing the wear plate, machining may be performed from and on the rear of the work piece.

It may be here pointed out that the work piece may of course assume many different configurations, but in the present instance it is assumed that the work piece is in the form of a hollow stud having an enlarged head. The shank of the stud is held at the sides between the two jaws 12 and 13 with the head H of the stud, FIGS. 1 and 2, facing rearwardly. The two legs 40A and 40B of the wear plate 40, FIG. 3, are of such width, and spaced one from the other, as to exert back pressure on the rear face of the head of the work piece while missing the shank of the work piece.

The wear plate 40 represents the effective (lower) end of a pressure plate 42, FIGS. 3 and 4, which is in the form of a second degree lever in the sense of being supported by a pair of pivot pins 44 at the end remote from the wear plate 40. The pivot pins in turn are press-fitted in a pair of spacers 45 and 46 which are anchored to the back plate 47 of the machine.

The wear plate 40 is of course normally in a retracted position, FIG. 4, ineffective to apply a clamping force, and to this end a coil spring 50 has the end portions thereof respectively seated in corresponding recesses in the pressure plate and the back plate, FIG. 4. Thus, the spring 50 normally positions the pressure plate in a retracted position.

The pressure plate is actuated or thrust in a forward direction by a clamping plate 52. The clamping plate 52 is in effect a force-multiplying first degree lever (7:1 ratio, for example) being pivoted on a pin 53 located adjacent the effective end of the pressure plate, but the pivot 53 is spaced substantially from the pivotal axis 44 of the pressure plate.

In order to assure the application of a straight line force when actuating the pressure plate, the operating end of the clamping plate or lever 52 is provided with a stud 55, FIG. 4, having a hardened head 55H to resist wear. The head of this stud is convex and bears on the flat head of a similar stud 56 carried at the effective end of the pressure plate 42. Thus, while both the pressure plate and the clamping plate swing on an arc during the establishment of clamping pressure, the rounded head 55H of the stud 55 will assure the application of a straight line force.

It will be noted that the clamping plate and the pressure plate are substantially parallel to one another, with a slight amount of necessary skewing to enable forces to be effectively applied, and the two axes 44 and 53 are substantially parallel in a horizontal sense. The clamping plate is actuated by an air operated piston 60, FIG. 4, and it will be appreciated that in the course of exerting pressure on the pressure plate 42 in a forward direction the piston 60 will be withdrawn by air under pressure in the related cylinder 61.

It will be seen from the foregoing that a small work piece to have a recess formed therein is effectively held against the force of the rotating tool by back pressure while initially locating and positioning the work piece at the work station by a slight amount of side pressure. In fact, it is possible to have the side pressure applied solely through the resiliently mounted camming plate 35 without resorting to the piston 15; but at other times the side pressure may be enlarged to augment or aid clamping pressure at the rear. By having the clamping plate and the pressure plate respectively in the form of first and second degree levers, the clamping force originating with the fluid operated piston 60 may be multiplied which both conserves air and allows a greater degree of tolerance in the amount of travel of the piston 60, bearing in mind that the environment in this instance assumes small or relatively frangible work pieces. The sequence of events may be controlled by limit switches and timers (not shown), and in this connection it will be appreciated that back pressure is not applied until the work piece has been initially located at the work station between the jaws 12 and 13, whereafter piston 60 is withdrawn rearwardly, FIG. 4, by air supplied to the cylinder 61, and effective back pressure of a predetermined amount is maintained until the desired machining operation has been completed. Piston 60 is then reversed, and the jaws 12 and 13 are opened to discharge the work piece.

Hence, while I have illustrated and described a preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a machine tool where a work piece to have a recess formed therein by a rotating tool is to be located at a work station in position to have the tool presented to one end thereof, the work station being open at both the front and back of the machine to enable a tool to approach the work piece from the front or back: means to feed work pieces one by one to the work station, means at the work station to apply holding forces to the sides of the work piece to locate the work piece as aforesaid, and means to apply back clamping pressure to the thus-held work piece to resist both the thrust and torque of the tool when exerted on the work piece from the front, the last-named means including a normally retracted pivoted pressure plate having an end portion aligned with the rear of the work station, said end portion having a recess therein to allow a tool to approach the work piece from the rear and presenting a leg engageable with a limited portion at the rear of the work piece to apply clamping pressure thereto, and means to thrust the pressure plate in a forward direction about the pivotal axis thereof to cause said end portion to bear with a predetermined amount of pressure on the rear of the work piece at the work station.

2. A machine tool according to claim 1 wherein the pressure plate is in the form of a second degree lever, a first degree lever for actuating the pressure plate and having an effective end adjacent said end portion of the pressure plate to apply an actuating thrust thereto, and a fluid actuated piston for operating said first degree lever.

3. A machine tool according to claim 2 wherein the second degree lever is a force-multiplying lever with the pivotal axis thereof adjacent said end portion of the pressure plate, the second degree lever being slightly divergent to the length of the pressure plate and the axes of the pressure plate and the second degree lever being parallel.

4. A machine tool according to claim 3 wherein means are provided between the engageable ends of the levers to produce substantially straight line motion to the pressure plate upon thrusting by the first degree lever.

References Cited

UNITED STATES PATENTS

| | | | |
|---|---|---|---|
| 154,813 | 9/1874 | Tingley | 10—107 |
| 1,486,467 | 3/1924 | Spitzfaden | 10—107 |
| 3,001,422 | 9/1961 | Klancnik | 10—107 |
| 3,416,173 | 12/1968 | Klancnik | 10—107 |
| 3,452,582 | 7/1969 | Faymonville | 10—12 |

CHARLES W. LANHAM, Primary Examiner

E. M. COMBS, Assistant Examiner